US009928965B2

(12) United States Patent
Sakurai

(10) Patent No.: US 9,928,965 B2
(45) Date of Patent: Mar. 27, 2018

(54) ELECTRICITY STORAGE MODULE

(71) Applicant: HONDA MOTOR CO., LTD., Tokyo (JP)

(72) Inventor: Atsushi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 658 days.

(21) Appl. No.: 14/543,898

(22) Filed: Nov. 18, 2014

(65) Prior Publication Data
US 2015/0140405 A1 May 21, 2015

(30) Foreign Application Priority Data

Nov. 18, 2013 (JP) .................................. 2013-237806

(51) Int. Cl.
*H01M 2/10* (2006.01)
*H01G 11/12* (2013.01)
*H01G 11/76* (2013.01)
*H01G 11/82* (2013.01)
*H01G 2/04* (2006.01)

(52) U.S. Cl.
CPC .............. *H01G 11/12* (2013.01); *H01G 2/04* (2013.01); *H01G 11/76* (2013.01); *H01G 11/82* (2013.01); *H01M 2/1077* (2013.01); *H01M 2220/20* (2013.01); *Y02E 60/13* (2013.01); *Y02T 10/7022* (2013.01)

(58) Field of Classification Search
CPC ........ H01G 11/12; H01G 11/82; H01G 11/76; H01G 2/04; H01M 2/1077; H01M 2220/20; Y02T 10/7022; Y02E 60/13
See application file for complete search history.

(56) References Cited

U.S. PATENT DOCUMENTS

2007/0053140 A1* 3/2007 Soliz ........................ H01G 2/02
361/502
2012/0104626 A1* 5/2012 Somani ............... H01L 21/6835
257/774

FOREIGN PATENT DOCUMENTS

JP  2012-160347  8/2012
JP  2012-256466  12/2012

OTHER PUBLICATIONS

English Machine Translation of Kume JP 2012-160347, Aug. 2012.*
Japanese Office Action for corresponding JP Application No. 2013-237806, dated Sep. 21, 2016 (w/ English machine translation).

* cited by examiner

*Primary Examiner* — Lisa S Park
(74) *Attorney, Agent, or Firm* — Mori & Ward, LLP

(57) ABSTRACT

An electricity storage module includes a plurality of electricity storage cells, a plurality of holders, first and second end plates, and a fastening frame. The plurality of holders are stacked in a stacking direction together with the plurality of electricity storage cells to provide a stack. The fastening frame is to fasten the first and second end plates in the stacking direction. The plurality of holders or at least one resin member disposed between the plurality of electricity storage cells and the fastening frame each has a protrusion that protrudes outward in a width direction of the plurality of holders or the at least one resin member. The protrusion is capable of elastic deformation and is to be pressed against the fastening frame to hold the plurality of electricity storage cells in the width direction or a vertical direction.

16 Claims, 4 Drawing Sheets

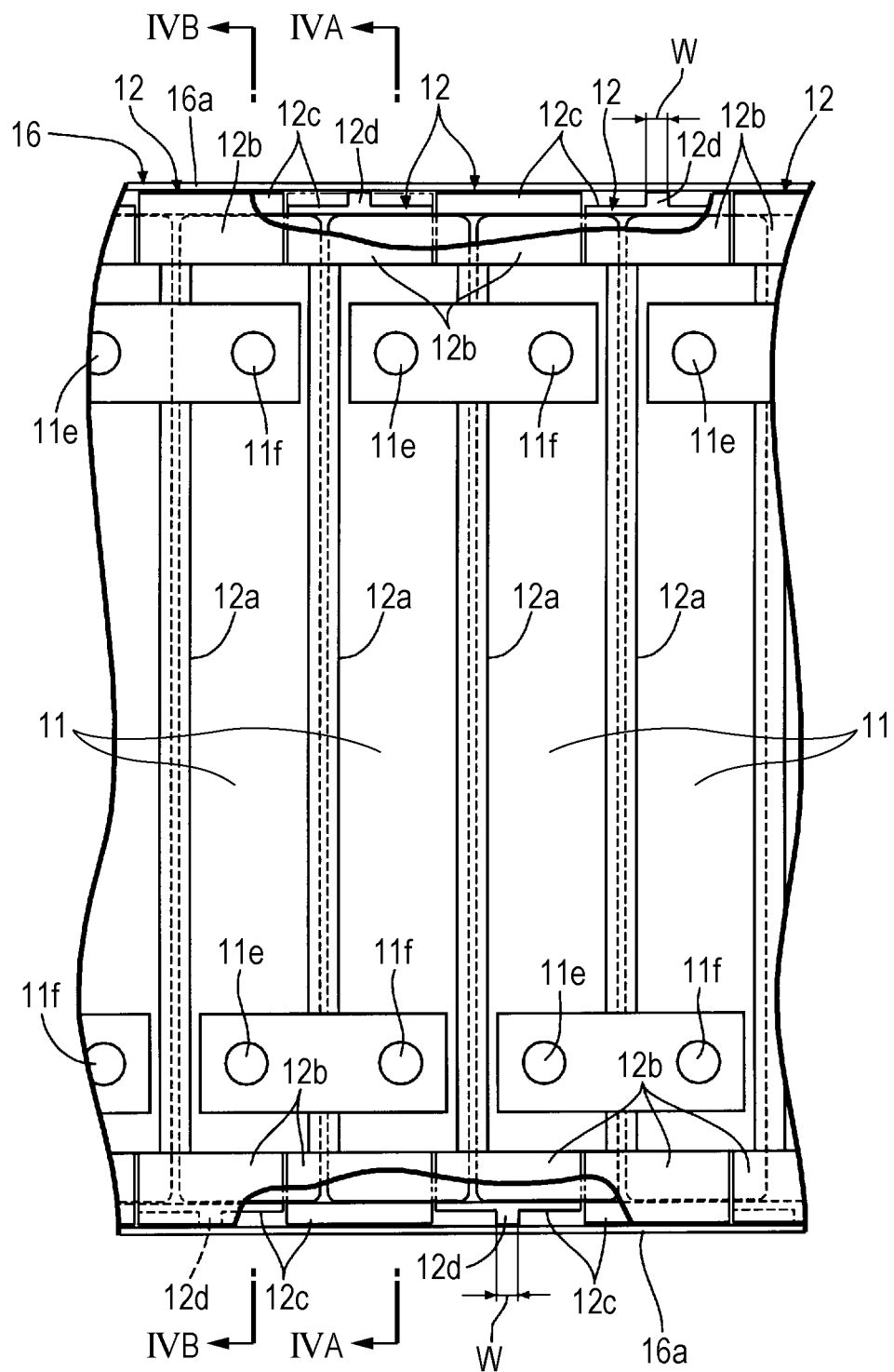

ELECTRICITY STORAGE MODULE

CROSS-REFERENCE TO RELATED APPLICATIONS

The present application claims priority under 35 U.S.C. § 119 to Japanese Patent Application No. 2013-237806, filed Nov. 18, 2013, entitled "Electricity Storage Module." The contents of this application are incorporated herein by reference in their entirety.

BACKGROUND

1. Field

The present disclosure relates to an electricity storage module.

2. Description of the Related Art

With regard to such an electricity storage module, Japanese Unexamined Patent Application Publication No. 2012-256466 describes a configuration in which plate strings are welded to the upper surface of a lower flange formed at the lower end of a ladder frame (fastening frame), and electricity storage cells are urged upward by the plate strings to press the electricity storage cells against the lower surface of an upper flange formed at the upper end of the ladder frame, thereby preventing backlash in the vertical direction of the electricity storage cells.

SUMMARY

According to one aspect of the present invention, an electricity storage module includes a plurality of electricity storage cells, a plurality of holders, a pair of end plates, and a fastening frame. The plurality of electricity storage cells are stacked in a stacking direction. The plurality of holders are stacked in the stacking direction together with the electricity storage cells to form a stack. The pair of end plates are disposed at opposite end portions in the stacking direction of the stack of the electricity storage cells and the holders. The fastening frame fastens the pair of end plates in the stacking direction. The holders, or one or more resin members disposed between the electricity storage cells and the fastening frame each have a protrusion that protrudes outward in a width direction and is capable of elastic deformation. The protrusion is pressed against the fastening frame to hold the electricity storage cells in the width direction or a vertical direction.

According to another aspect of the present invention, an electricity storage module includes a plurality of electricity storage cells, a plurality of holders, first and second end plates, and a fastening frame. The plurality of electricity storage cells are stacked in a stacking direction. The plurality of holders are stacked in the stacking direction together with the plurality of electricity storage cells to provide a stack having a first end portion and a second end portion opposite to the first end portion in the stacking direction. The first and second end plates are disposed at the first and second end portions, respectively. The fastening frame is to fasten the first and second end plates in the stacking direction. The plurality of holders or at least one resin member disposed between the plurality of electricity storage cells and the fastening frame each has a protrusion that protrudes outward in a width direction of the plurality of holders or the at least one resin member. The protrusion is capable of elastic deformation and is to be pressed against the fastening frame to hold the plurality of electricity storage cells in the width direction or a vertical direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a view as seen along an arrow III in FIG. 2; and

DESCRIPTION OF THE EMBODIMENTS

Figure 1:
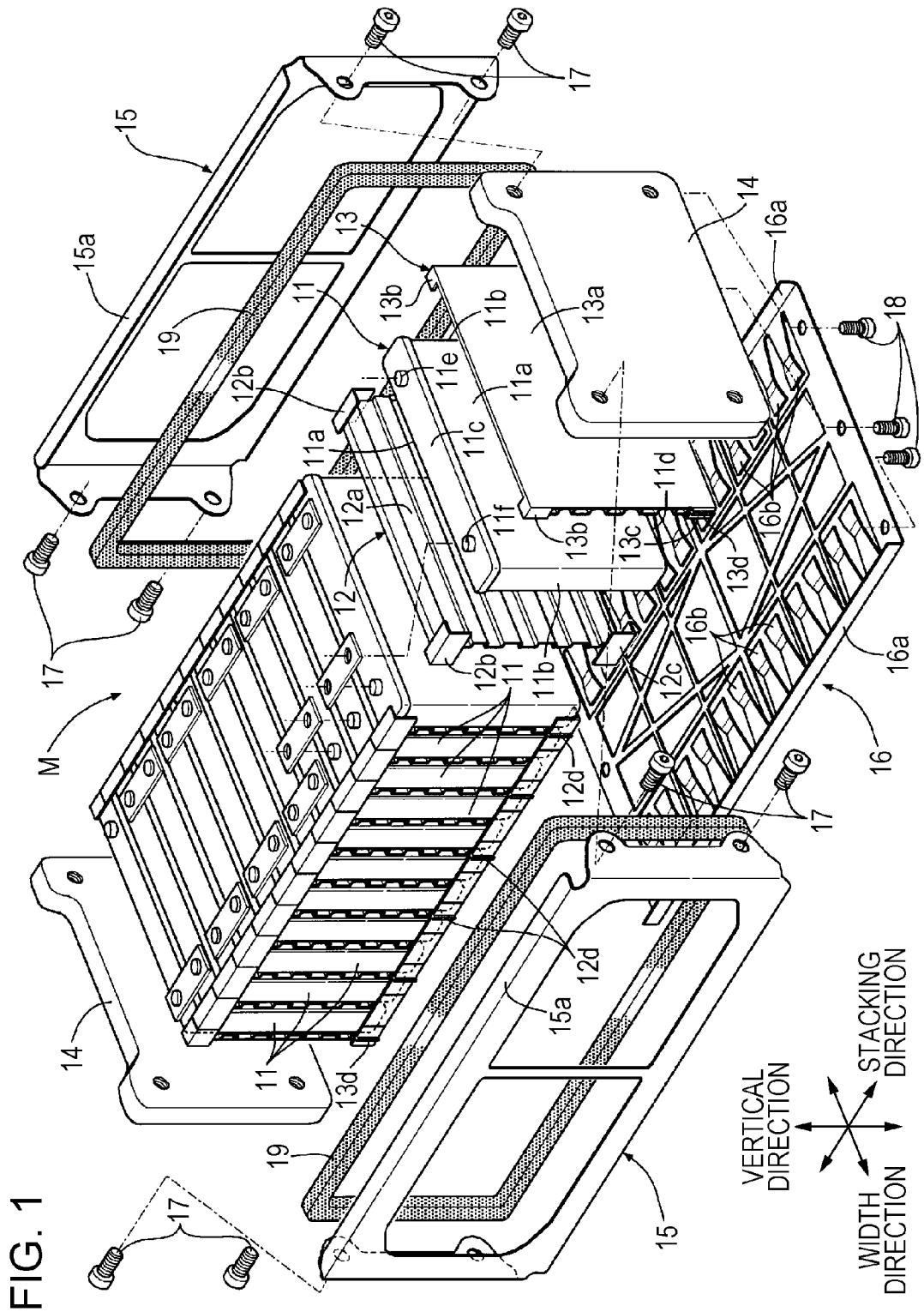
FIG. 1 is an exploded perspective view of an electricity storage module.

The embodiments will now be described with reference to the accompanying drawings, wherein like reference numerals designate corresponding or identical elements throughout the various drawings.

Figure 2:
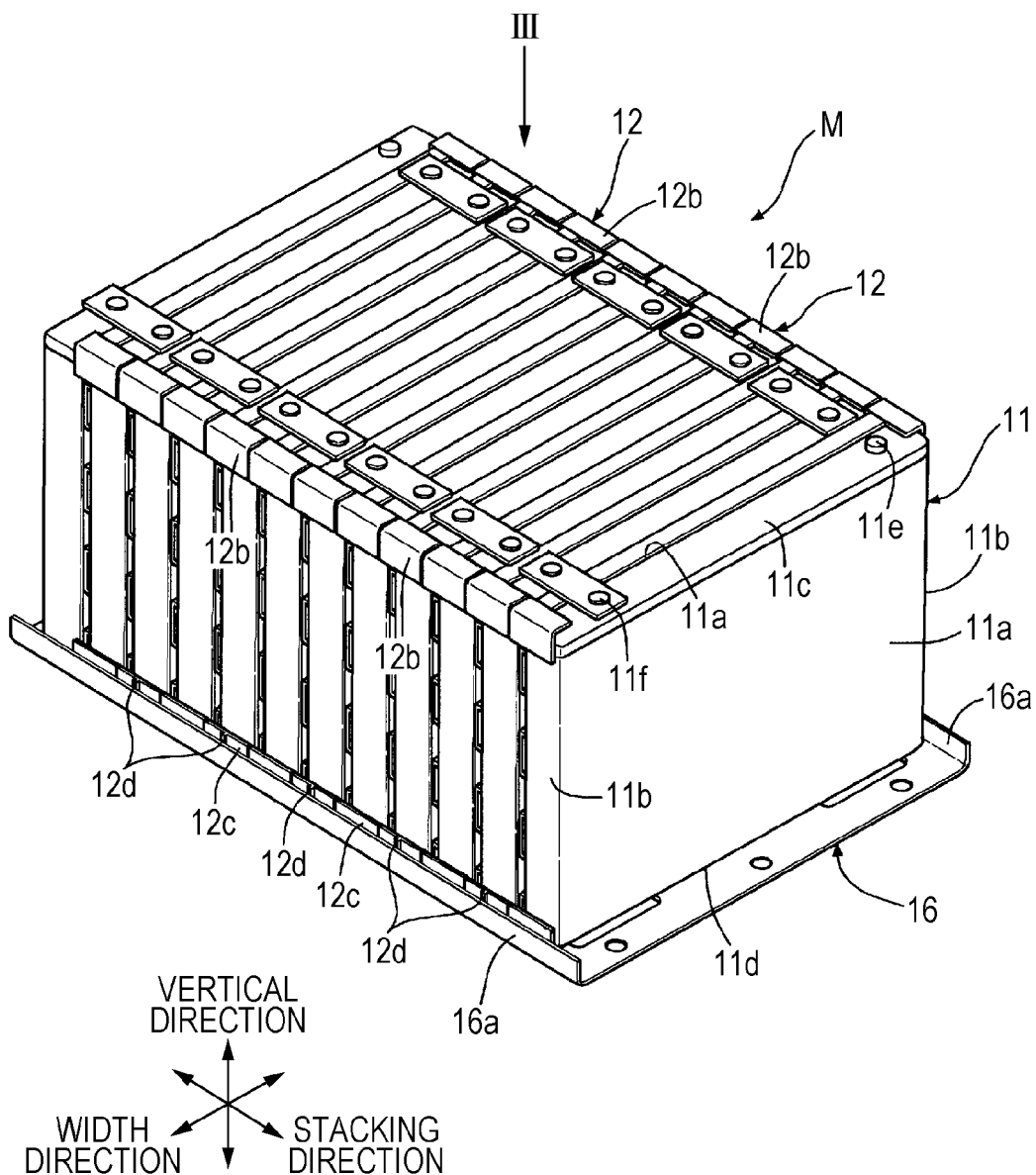
FIG. 2 is a perspective view of the electricity storage module, with side fastening frames, end plates, end electricity-storage cell holders, and insulators being removed.
Figure 4A:
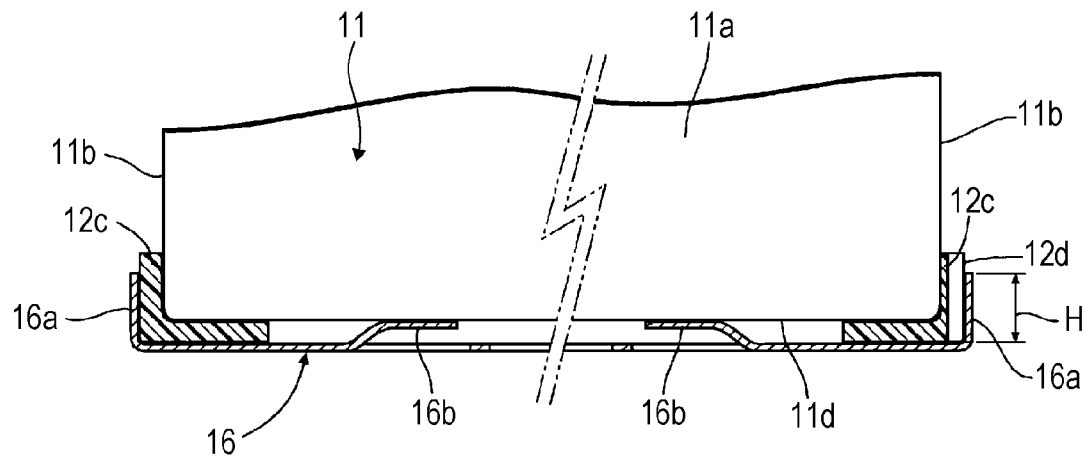
FIGS. 4A and 4B are cross-sectional views taken along lines IVA-IVA and IVB-IVB, respectively, in FIG. 3.
Figure 4B:
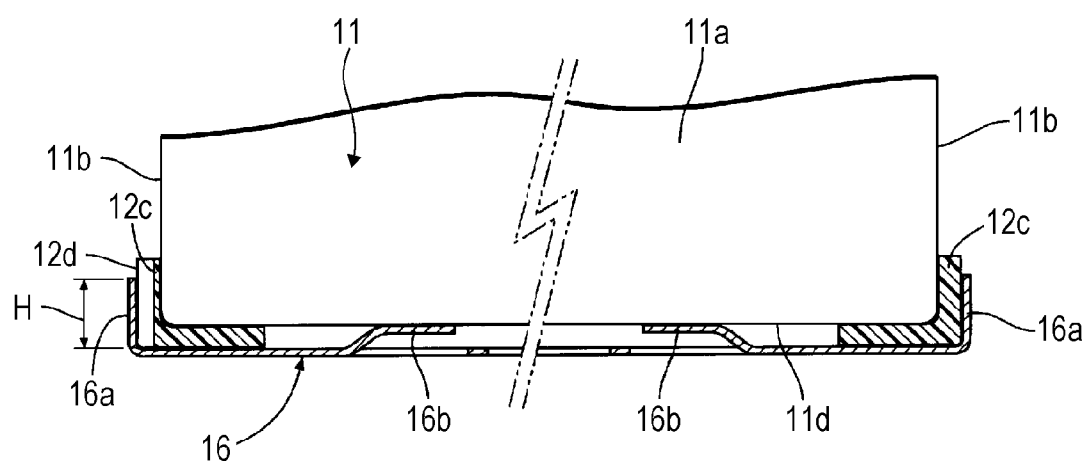

As illustrated in FIGS. 1 and 2, an electricity storage module M used as a power supply for an electric vehicle or a hybrid vehicle includes a predetermined number of (twelve in the embodiment) electricity storage cells 11 that are stacked in the stacking direction. The electricity storage cells 11 according to the embodiment are lithium-ion cells. The electricity storage cells 11 have a rectangular parallelepiped shape. Each of the electricity storage cells 11 has a pair of principal surfaces 11a that are opposite to each other, a pair of side surfaces 11b that are orthogonal to the principal surfaces 11a and are opposite to each other, and a top surface 11c and a bottom surface 11d that are orthogonal to the principal surfaces 11a and the side surfaces 11b and are opposite to each other. The top surface 11c is provided with a positive terminal 11e and a negative terminal 11f. The positive terminals 11e and the negative terminals 11f of the twelve electricity storage cells 11 are electrically connected in series.

In this specification, the direction perpendicular to the stacking direction and connecting the top surface 11c and the bottom surface 11d of each of the electricity storage cells 11 is defined as vertical direction, and the direction perpendicular to the stacking direction and connecting the pair of side surfaces 11b of each of the electricity storage cells 11 is defined as width direction.

The principal surfaces 11a of the twelve electricity storage cells 11, and eleven intermediate electricity-storage cell holders 12 made of synthetic resin and having a rectangular plate-like shape are alternately overlaid on each other in the stacking direction to form a stack. A pair of end electricity-storage cell holders 13 made of synthetic resin and having a rectangular plate-like shape are overlaid on the outside in the stacking direction of two electricity storage cells 11 located at opposite ends in the stacking direction of the stack. Further, a pair of end plates 14 made of metal are further overlaid on the outside in the stacking direction of the resulting stack.

In a state in which the electricity storage cells 11, the intermediate electricity-storage cell holders 12, the end electricity-storage cell holders 13, and the end plates 14 are stacked in the stacking direction, opposite end portions in the stacking direction of a pair of side fastening frames 15, which are formed by plate-like members made of metal, are fastened to opposite end portions in the width direction of the pair of end plates 14 with bolts 17, and opposite end portions in the stacking direction of a bottom fastening frame 16 formed by a plate-like member made of metal are fastened to lower end portions of the pair of end plates 14 with bolts 18, thereby assembling the electricity storage module M having the twelve electricity storage cells 11. At this time, insulators 19 made of synthetic resin are disposed between the electricity storage cells 11, the intermediate electricity-storage cell holders 12, the end electricity-storage cell holders 13, and the side fastening frames 15 to prevent liquid junction between the electricity storage cells 11 and the side fastening frames 15 due to dew condensation water.

Each of the intermediate electricity-storage cell holders 12 includes a holder body part 12a, a pair of upper electricity-storage cell holding parts 12b, and a pair of lower electricity-storage cell holding parts 12c. The holder body part 12a has a corrugated plate-like shape and is sandwiched between the principal surfaces 11a of each pair of electricity storage cells 11 that are adjacent to each other. The pair of upper electricity-storage cell holding parts 12b have an L-shaped cross section and overhang in the stacking direction from opposite ends in the width direction of an upper portion of the holder body part 12a. The pair of lower electricity-storage cell holding parts 12c have an L-shaped cross section and overhang in the stacking direction from opposite ends in the width direction of a lower portion of the holder body part 12a. Likewise, each of the end electricity-storage cell holders 13 includes a holder body part 13a, a pair of upper electricity-storage cell holding parts 13b, a pair of lower electricity-storage cell holding parts 13c. The end electricity-storage cell holders 13 are sandwiched between the electricity storage cells 11 and the end plates 14. The end electricity-storage cell holders 13 differ slightly in shape from but have the same function as the intermediate electricity-storage cell holders 12.

Accordingly, when twelve electricity storage cells 11, eleven intermediate electricity-storage cell holders 12, and two end electricity-storage cell holders 13 are stacked, the respective upper electricity-storage cell holding parts 12b and 13b of the intermediate electricity-storage cell holders 12 and the end electricity-storage cell holders 13 engage the four corners of the electricity storage cells 11. Further, at this time, the respective upper electricity-storage cell holding parts 12b and 13b of each one intermediate electricity-storage cell holder 12 and each one end electricity-storage cell holder 13 that are adjacent to each other engage each other in the stacking direction, and the respective lower electricity-storage cell holding parts 12c and 13c of each one intermediate electricity-storage cell holder 12 and each one end electricity-storage cell holder 13 that are adjacent to each other engage each other in the stacking direction. As a result, the twelve electricity storage cells 11 are held in proper alignment.

The bottom fastening frame 16 formed by a rectangular metallic plate is folded over upward at opposite end portions in the width direction into an L-shape in cross-section, forming a pair of flanges 16a. The respective pairs of lower electricity-storage cell holding parts 12c and 13c of the intermediate electricity-storage cell holders 12 and the end electricity-storage cell holders 13 are held in place so as to be sandwiched between the pair of flanges 16a.

A part of the bottom fastening frame 16 is cut and raised to form twenty four plate springs 16b (see FIG. 1). Each two plate springs 16b urge the bottom surface 11d of each of the electricity storage cells 11 upward, thereby pressing the top surface 11c of each of the electricity storage cells 11 against a pair of flanges 15a of the side fastening frames 15. The flanges 15a are formed by folding over the upper ends of the side fastening frames 15 inward in the width direction.

As illustrated in FIGS. 2 to 4B, the lower electricity-storage cell holding parts 12c and 13c of the intermediate electricity-storage cell holders 12 and the end electricity-storage cell holder 13 each have a protrusion 12d and a protrusion 13d provided at one side in the width direction, respectively. The protrusions 12d and 13d have a rib-like shape extending in the vertical direction, and protrude outward in the width direction. As the lower electricity-storage cell holding parts 12c and 13c are pushed in between the pair of flanges 16a of the bottom fastening frame 16, the protrusions 12d and 13d undergo elastic deformation so as to be crushed.

The protrusions 12d and 13d, each of which is provided only at one side in the width direction of each one lower electricity-storage cell holding part 12c and each one lower electricity-storage cell holding part 13c, protrude in alternately opposite directions. In other words, the protrusions 12d of each two adjacent intermediate electricity-storage cell holders 12, or the respective protrusions 12d and 13d of each one intermediate electricity-storage cell holder 12 and each one end electricity-storage cell holder 13 that are adjacent to each other protrude in directions opposite to each other.

Next, operation according to the embodiment of the present disclosure configured as described above will be described.

The pair of end plates 14, which are disposed at opposite ends in the stacking direction of the stack of twelve electricity storage cells 11, eleven intermediate electricity-storage cell holders 12, and two end electricity-storage cell holders 13 that are stacked in a predetermined order, are fastened to the respective opposite end portions in the stacking direction of the pair of side fastening frames 15 and the bottom fastening frame 16, with the bolts 17 and 18, respectively. At this time, the pair of end plates 14 are urged toward each other by the fastening force exerted by the bolts 17 extending in the stacking direction. Consequently, the twelve electricity storage cells 11 are clamped together in the stacking direction, thus preventing backlash.

Further, the electricity storage cells 11 are urged upward by the plate springs 16b provided to the bottom fastening frame 16, and opposite end portions in the width direction of the top surfaces 11c of the electricity storage cells 11 are pressed against the lower surfaces of the flanges 15a provided at the upper ends of the pair of side fastening frames 15. As a result, backlash in the vertical direction of the electricity storage cells 11 is prevented.

Furthermore, the intermediate electricity-storage cell holders 12 and the end electricity-storage cell holders 13 which hold the electricity storage cells 11 each have the protrusion 12d and the protrusion 13d formed at one side in the width direction of the lower electricity-storage cell holding parts 12c and 13c, respectively. As the protrusions 12d and 13d are pressed against the inner surface in the width direction of one of the flanges 16a of the bottom fastening frame 16 and crushed, the resulting reaction force causes the intermediate electricity-storage cell holders 12 and the end electricity-storage cell holders 13 to be pressed against the other flange 16a of the bottom fastening frame 16, thereby preventing backlash in the width direction of the intermediate electricity-storage cell holders 12 and the end electricity-storage cell holders 13. Furthermore, the frictional force acting on the protrusions 12d and 13d also prevents backlash in the vertical direction. As a result, the electricity storage cells 11 sandwiched and held by the intermediate electricity-storage cell holders 12 and the end electricity-storage cell holders 13 are also restrained in the width direction and the vertical direction, thereby preventing backlash in the width and vertical directions of the electricity storage cells 11.

As described above, elastic deformation of the protrusions 12d and 13d is exploited to prevent backlash in the width and vertical directions of the intermediate electricity-storage cell holders 12 and the end electricity-storage cell holders 13 with respect to the bottom fastening frame 16 in order to securely hold the electricity storage cells 11 in place, without requiring a dedicated member such as a spring. As a result, the electricity storage module M may be reduced in size and weight.

The protrusion 12d and the protrusion 13d are provided only at one side in the width direction of each one intermediate electricity-storage cell holder 12 and each one end electricity-storage cell holder 13, respectively. Therefore, backlash in the width and vertical directions of the electricity storage cells 11 may be prevented while minimizing the number of the protrusions 12d and 13d. Furthermore, the protrusions 12d and 13d that are adjacent to each other protrude in alternately opposite directions. As a result, the load applied to one of the flanges 16a in the width direction of the bottom fastening frame 16, and the load applied to the other flange 16a in the width direction may be made uniform.

The rigidity of the protrusions 12d and 13d, which are deformed when pressed against the flanges 16a of the bottom fastening frame 16, may be varied simply by varying the material of the synthetic resin forming the protrusions 12d and 13d, or by varying the contact area of the protrusions 12d and 13d with the flanges 16a, that is, the height H in the vertical direction (see FIGS. 4A and 4B) or the width W in the stacking direction (see FIG. 3) of the portions of the protrusions 12d and 13d which undergo elastic deformation. As a result, the force with which the electricity storage cells 11 are held may be adjusted easily as desired.

The bottom fastening frame 16 includes the pair of flanges 16a, and the protrusions 12d and 13d are pressed against the pair of flanges 16a. Accordingly, even when the bottom fastening frame 16 is deformed by a load due to vibration or the like, the separation between the pair of flanges 16a is kept constant, thereby effectively preventing backlash in the electricity storage cells 11. Furthermore, the bottom fastening frame 16 is reinforced by the pair of flanges 16a. As a result, the bottom fastening frame 16 itself becomes more rigid and hence less susceptible to deformation, thus allowing backlash in the electricity storage cells 11 to be prevented further effectively.

While the embodiment of the present disclosure has been described above, various design modifications may be made without departing from the scope of the present disclosure.

For example, in the above embodiment, the protrusions 12d and 13d are provided in the intermediate electricity-storage cell holders 12 and the end electricity-storage cell holders 13, respectively. However, each of these protrusions may be provided in any given resin member disposed between the electricity storage cells 11 and the side fastening frames 15 or between the electricity storage cells 11 and the bottom fastening frame 16.

In the above embodiment, the protrusions 12d and 13d are pressed against the flanges 16a of the bottom fastening frame 16. However, the protrusions 12d and 13d may be pressed against any given portion of the bottom fastening frame 16.

The member against which the protrusions 12d and 13d are pressed is not limited to the bottom fastening frame 16. The protrusions 12d and 13d may be pressed against the side fastening frames 15.

In the above embodiment, the protrusion 12d and the protrusion 13d are provided only at one end in the width direction of each one intermediate electricity-storage cell holder 12 and each one end electricity-storage cell holder 13, respectively. However, the protrusion 12d and the protrusion 13d may be formed at both ends in the width direction.

According to a first aspect of the present disclosure, there is proposed an electricity storage module including a plurality of electricity storage cells that are stacked in a stacking direction, a plurality of holders that are stacked in the stacking direction together with the electricity storage cells to form a stack, a pair of end plates that are disposed at opposite end portions in the stacking direction of the stack of the electricity storage cells and the holders, and a fastening frame that fastens the pair of end plates in the stacking direction. The holders, or one or more resin members disposed between the electricity storage cells and the fastening frame each have a protrusion that protrudes outward in a width direction and is capable of elastic deformation, and the protrusion is pressed against the fastening frame to hold the electricity storage cells in the width direction or a vertical direction.

According to the configuration in the first aspect, the electricity storage module includes a plurality of electricity storage cells that are stacked in the stacking direction, a plurality of holders that are stacked in the stacking direction together with the electricity storage cells to form a stack, a pair of end plates that are disposed at opposite end portions in the stacking direction of the stack of the electricity storage cells and the holders, and a fastening frame that fastens the pair of end plates in the stacking direction. The holders, or one or more resin members disposed between the electricity storage cells and the fastening frame each have a protrusion that protrudes outward in the width direction and is capable of elastic deformation. The protrusion is pressed against the fastening frame to hold the electricity storage cells in the width direction or the vertical direction. Therefore, elastic deformation of the protrusion is exploited to prevent backlash in the width or vertical direction of the holders with respect to the fastening frame in order to securely hold the electricity storage cells in place, without requiring a dedicated urging member such as a spring. As a result, the electricity storage module may be reduced in size and weight.

According to a second aspect of the present disclosure, in addition to the configuration in the first aspect, the protrusion may be provided only at one side in the width direction.

According to the configuration in the second aspect, the protrusion may be provided only at one side in the width direction. Therefore, backlash in the width direction of the electricity storage cells may be prevented while minimizing the number of protrusions.

According to a third aspect of the present disclosure, in addition to the configuration in the second aspect, the protrusions of the holders or the resin members that are adjacent to each other may protrude in alternately opposite directions.

According to the configuration in the third aspect, the protrusions of adjacent holders or resin members may protrude in alternately opposite directions. Therefore, the load applied to one side in the width direction of the fastening frame, and the load applied to the other side in the width direction may be made uniform. Furthermore, the load applied to each of busbars that interconnect the terminals of the electricity storage cells may be made uniform.

According to a fourth aspect of the present disclosure, in addition to the configuration in any one of the first to third aspects, a holding force with which the electricity storage cells are held in the width direction or the vertical direction may be adjusted by varying a rigidity of the protrusion.

According to the configuration in the fourth aspect, the holding force with which the electricity storage cells are held in the width direction or the vertical direction may be adjusted by varying the rigidity of the protrusion. Therefore, the force with which the electricity storage cells are held may be adjusted as desired by simply varying the material or shape of the protrusion.

According to a fifth aspect of the present disclosure, in addition to the configuration in the fourth aspect, the holding force may be adjusted by varying an area of contact of the protrusion with the fastening frame.

According to the configuration in the fifth aspect, the holding force may be adjusted by varying the area of contact of the protrusion with the fastening frame. Therefore, the force with which the electricity storage cells are held may be adjusted as desired by simply varying the dimensions of the protrusion.

According to a sixth aspect of the present disclosure, in addition to the configuration in any one of the first to fifth aspects, the fastening frame may include a pair of parallel portions that are opposite to each other in the width direction or the vertical direction, and the protrusion may be pressed against each of the parallel portions.

According to the configuration in the sixth aspect, the fastening frame may include a pair of parallel portions that are opposite to each other in the width direction or the vertical direction, and the protrusion may be pressed against each of the parallel portions. Therefore, even when the fastening frame is deformed by a load due to vibration or the like, the separation between the pair of parallel portions is kept constant, thereby effectively preventing backlash in the electricity storage cells. Furthermore, the fastening frame is reinforced by the pair of parallel portions. As a result, the fastening frame itself becomes more rigid and hence less susceptible to deformation, thus allowing backlash in the electricity storage cells to be prevented further effectively.

The intermediate electricity-storage cell holders 12 and the end electricity-storage cell holders 13 according to the embodiment correspond to the holders according to the present disclosure. The bottom fastening frame 16 according to the embodiment corresponds to the fastening frame according to the present disclosure. The flanges 16a according to the embodiment correspond to the parallel portions according to the present disclosure.

Obviously, numerous modifications and variations of the present invention are possible in light of the above teachings. It is therefore to be understood that within the scope of the appended claims, the invention may be practiced otherwise than as specifically described herein.

What is claimed is:
1. An electricity storage module comprising:
a plurality of electricity storage cells that are stacked in a stacking direction;
a plurality of holders that are stacked in the stacking direction together with the electricity storage cells to form a stack;
a pair of end plates that are disposed at opposite end portions in the stacking direction of the stack of the electricity storage cells and the holders; and
a fastening frame that fastens the pair of end plates in the stacking direction,
wherein the holders, or one or more resin members disposed between the electricity storage cells and the fastening frame each have a protrusion at one side with respect to each of the electricity storage cells and no protrusion at another side opposite to the one side in a width direction perpendicular to the stacking direction, the protrusion protruding outward in the width direction to be elastically deformed against the fastening frame to hold at least one of the electricity storage cells in the width direction or a vertical direction perpendicular to the stacking direction and the width direction.

2. The electricity storage module according to claim 1, wherein the electricity storage cells include a first electricity cell and a second electricity cell adjacent to the first electricity cell in the stacking direction,
wherein the holders or the one or more resin members have the protrusion at a first side with respect to the first electricity storage cell,
wherein the holders or the one or more resin members have no protrusion at a second side with respect to the first electricity storage cell, the second side being opposite to the first side in the width direction,
wherein the holders or the one or more resin members have no protrusion at the first side with respect to the second electricity storage cell, and
wherein the holders or the one or more resin members have the protrusions at the second side with respect to the second electricity storage cell.

3. The electricity storage module according to claim 1, wherein a holding force with which the electricity storage cells are held in the width direction or the vertical direction is adjusted by varying a rigidity of the protrusion.

4. The electricity storage module according to claim 3, wherein the holding force is adjusted by varying an area of contact of the protrusion with the fastening frame.

5. The electricity storage module according to claim 1, wherein the fastening frame includes a pair of parallel portions that are opposite to each other in the width direction or the vertical direction, and the protrusion is pressed against each of the parallel portions.

6. An electricity storage module comprising:
a plurality of electricity storage cells stacked in a stacking direction;
a plurality of holders stacked in the stacking direction together with the plurality of electricity storage cells to provide a stack having a first end portion and a second end portion opposite to the first end portion in the stacking direction;
first and second end plates disposed at the first and second end portions, respectively; and
a fastening frame to fasten the first and second end plates in the stacking direction, the plurality of holders or at least one resin member disposed between the plurality of electricity storage cells and the fastening frame having a protrusion at one side with respect to each of the electricity storage cells and no protrusion at another side opposite to the one side in a width direction perpendicular to the stacking direction, the protrusion protruding outward in the width direction to be elastically deformed against the fastening frame to hold at least one of the plurality of electricity storage cells in the width direction or a vertical direction perpendicular to the stacking direction and the width direction.

7. The electricity storage module according to claim 6, wherein the electricity storage cells include a first electricity cell and a second electricity cell adjacent to the first electricity cell in the stacking direction,
wherein the plurality of holders or the at least one resin member has the protrusion at a first side with respect to the first electricity storage cell,
wherein the plurality of holders or the at least one resin member has no protrusion at a second side with respect to the first electricity storage cell, the second side being opposite to the first side in the width direction,
wherein the plurality of holders or the at least one resin member has no protrusion at the first side with respect to the second electricity storage cell, and
wherein the plurality of holders or the at least one resin member has the protrusion at the second side with respect to the second electricity storage cell, the second side being opposite to the first side in the width direction.

8. The electricity storage module according to claim 6, wherein a holding force with which the plurality of electricity storage cells are held in the width direction or the vertical direction is adjusted by varying a rigidity of the protrusion.

9. The electricity storage module according to claim 8, wherein the holding force is adjusted by varying an area of contact of the protrusion with the fastening frame.

10. The electricity storage module according to claim 6, wherein the fastening frame includes a first parallel portion and a second parallel portion that is opposite to the first parallel portion in the width direction or the vertical direction, and the protrusion is pressed against each of the first and second parallel portions.

11. The electricity storage module according to claim 6, wherein the fastening frame includes a first flange and a second flange that is opposite to the first flange in the width direction, the first and second flanges extend in the stacking direction, and
wherein the plurality of holders are disposed so as to be sandwiched between the first flange and the second flange in the width direction.

12. The electricity storage module according to claim 11, wherein the protrusion is pressed against the first and second flanges to hold the plurality of electricity storage cells in the width direction.

13. The electricity storage module according to claim 1, wherein the protrusion has a thickness smaller than a thickness of each of the electricity storage cells in the stacking direction, and
wherein the protrusion extends in the vertical direction.

14. The electricity storage module according to claim 6, wherein the protrusion has a thickness smaller than a thickness of each of the electricity storage cells in the stacking direction, and
wherein the protrusion extends in the vertical direction.

15. An electricity storage module comprising:
electricity storage cells stacked in a stacking direction;
holders stacked in the stacking direction together with the electricity storage cells to provide a stack having a first end portion and a second end portion opposite to the first end portion in the stacking direction, each of the holders including an L-shaped cell holding part with which each of the electricity storage cells is supported;
first and second end plates disposed at the first and second end portions, respectively; and
a fastening frame to fasten the first and second end plates in the stacking direction, the plurality of holders or at least one resin member disposed between the plurality of electricity storage cells and the fastening frame each having a protrusion that protrudes from the L-shaped cell holding part outward in a width direction of the plurality of holders or the at least one resin member to be elastically deformed against the fastening frame to hold the plurality of electricity storage cells in the width direction or a vertical direction.

16. The electricity storage module according to claim 15, wherein the protrusion has a thickness smaller than a thickness of L-shaped cell holding part in the stacking direction.

* * * * *